UNITED STATES PATENT OFFICE.

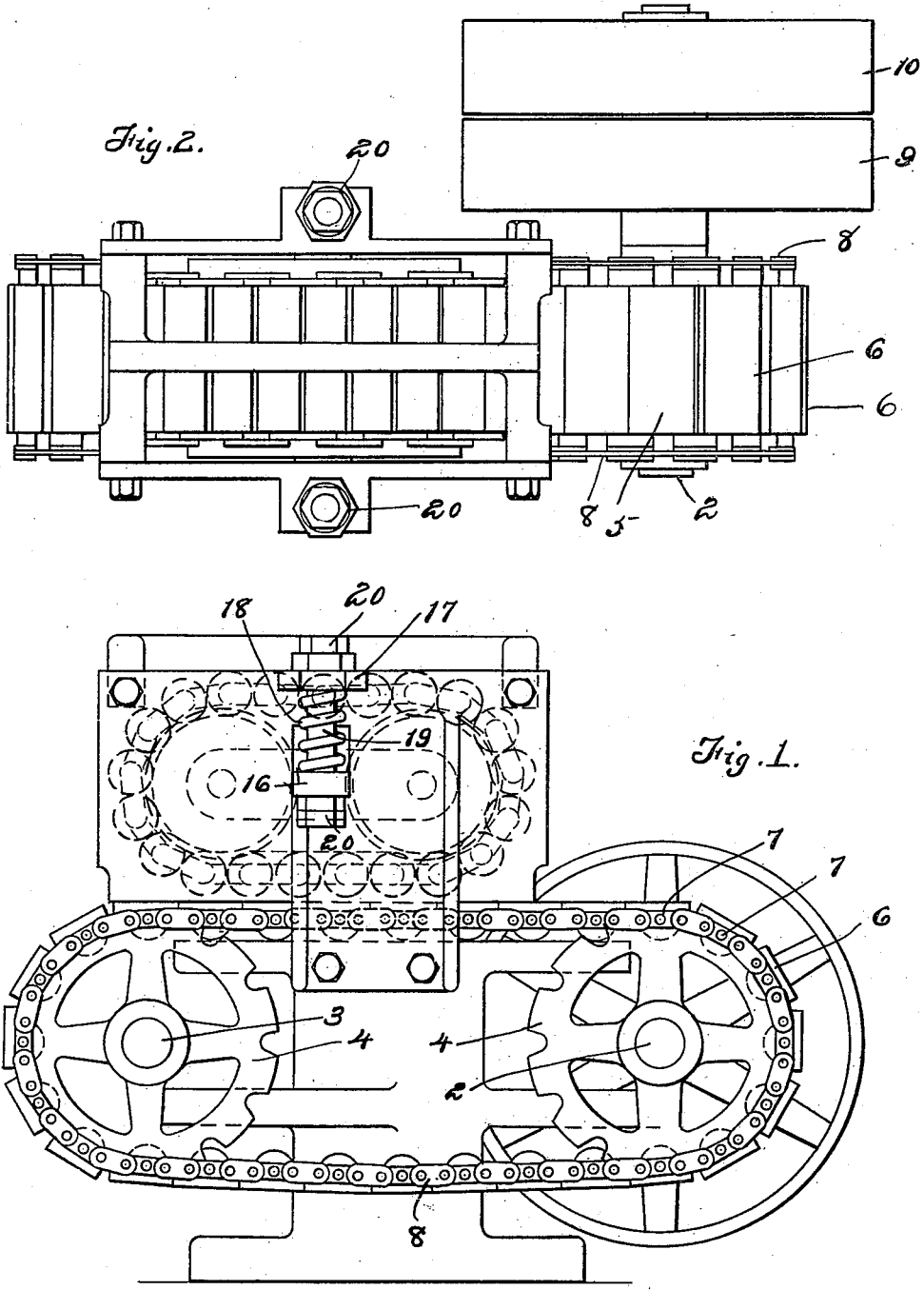

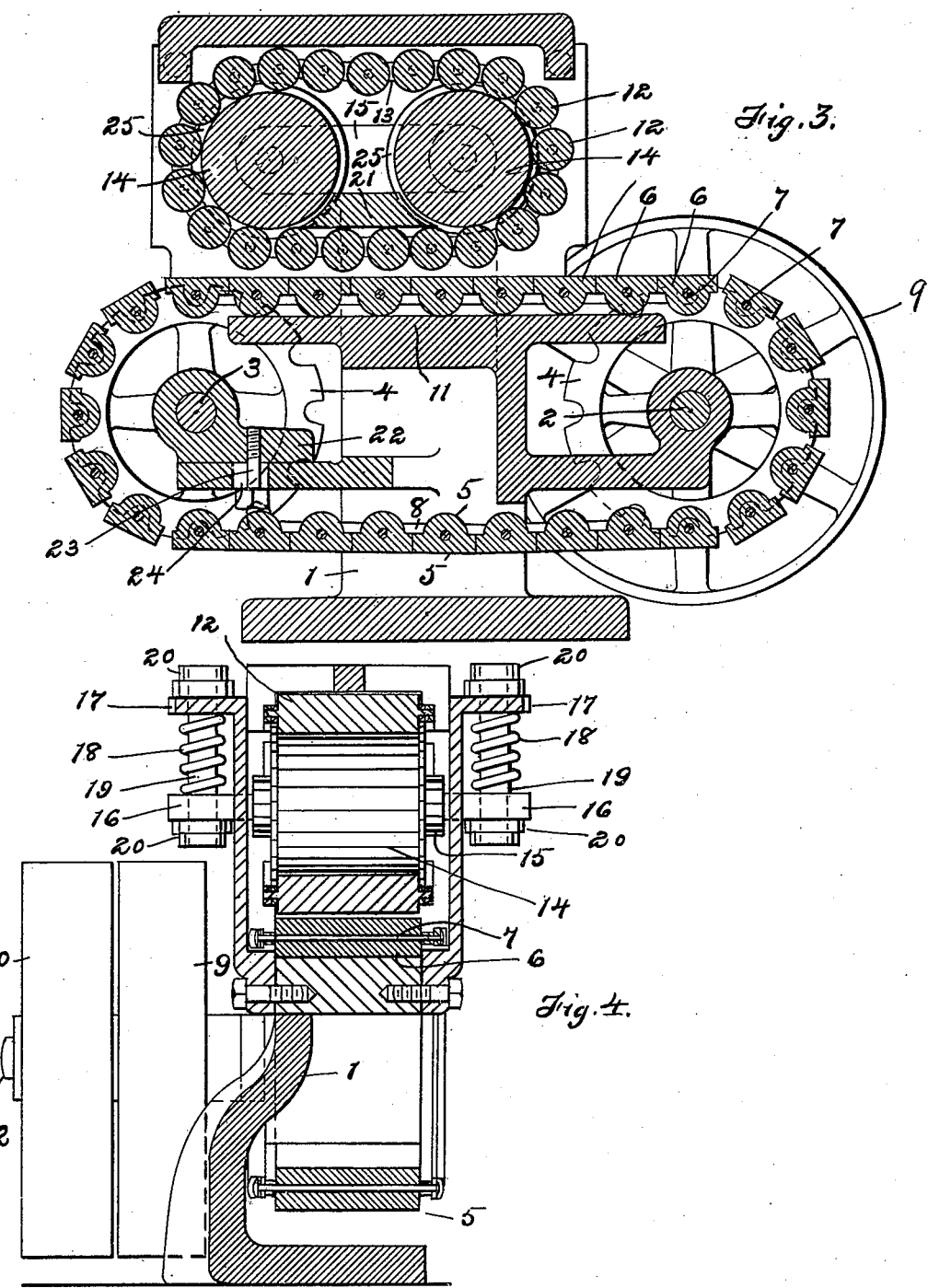

HAROLD A. WEBSTER, OF HAVERHILL, MASSACHUSETTS, ASSIGNOR OF ONE-HALF TO HERBERT B. NEWTON, OF SAME PLACE.

LEATHER-ROLLING MACHINE.

SPECIFICATION forming part of Letters Patent No. 667,270, dated February 5, 1901.

Application filed April 26, 1900. Serial No. 14,418. (No model.)

*To all whom it may concern:*

Be it known that I, HAROLD A. WEBSTER, of Haverhill, in the county of Essex and State of Massachusetts, have invented certain new and useful Improvements in Machines for Rolling Leather, of which the following is a specification.

This invention has for its object to provide an improved machine for rolling leather or similar material to remove waves and other inequalities and render it more compact.

The invention involves the use of an endless traveling flat conveyer or apron propelled in a suitable manner and an opposed rolling device which preferably takes the form of an endless series of rollers loosely or idly mounted and provided with suitable yielding bearings, whereby a yielding pressure is exerted on the material which is being rolled.

Of the accompanying drawings, Figure 1 represents a side elevation of a rolling-machine constructed in accordance with my invention. Fig. 2 represents a plan view thereof. Fig. 3 represents a longitudinal vertical section. Fig. 4 represents a transverse vertical section.

The same reference characters indicate the same parts in all the figures.

In the drawings, 1 designates a suitable frame having bearings for two shafts 2 3, on each of which is mounted a pair of sprocket-wheels 4 4, and on one of which, as the shaft 2, are mounted suitable fast and loose pulleys 9 10 for rotating said shaft.

5 represents an endless traveling apron or carrier composed of a series of flat-topped lags or sections 6 6, mounted upon cross-rods 7 7, which are connected by two chains 8 8, and the ends of which are adapted to lodge between the teeth of the sprocket-wheels 4 4. The revolution of the shaft 2 propels the apron or carrier 5, and the manner of mounting said apron on the sprocket-wheels causes the carrier to assume the shape represented in Fig. 3—that is, with two approximately parallel horizontal stretches. The upper stretch of the carrier is supported by a flat horizontal table portion 11 of the frame 1, and its upper surface presents a continuous unbroken flat surface, upon which the material to be rolled is supported. Adjustment of the carrier to take up slack may permissibly be effected, as shown in Fig. 3, by mounting one of the shafts 3 in a movable bearing 22, adjustably secured to the frame 1 by a bolt 23, passing through a slot 24 in said frame.

12 12 represent rollers mounted in endless series and their trunnions connected by chains 13 13, the said series of rollers being supported on two guide-rolls 14 14, having end flanges 25 to retain the rollers 12 in place as respects lateral movement. The guide-rolls 14 are journaled in a frame 15, which has laterally-projecting lugs 16, passing through slots in the upper part of the frame 1. Similar fixed lugs 17 are formed on the frame above the lugs 16, and between said lugs 16 and 17 are interposed springs 18, which surround guide-rods 19. The latter have heads or enlargements 20 20 at their ends to limit the movement of frame 15. Between the two rolls 14 14 the frame is provided with a cross-piece 21, flat on its under side and adapted to provide a rolling-surface for the rollers 12 12, the lower stretch of said rollers being maintained as near as possible in a straight line.

The material to be acted upon is inserted in the machine between the carrier 5 and the rollers 12 and is propelled by the friction exerted on it by the moving carrier. Each roll 12 rotates on its own axis as the work passes beneath it, and the whole series of rollers 12 is subject to a movement of translation at a slower rate than the movement of the carrier 6. A yielding downward pressure is exerted on the series of rollers 12 by the springs 18, which yield readily to admit material of different thicknesses between the carrier and rollers. The machine shown is particularly adapted for rolling sole-leather, with the object of removing wrinkles, waves, and inequalities in the leather. It is to be noted that the mounting of the pressure-rolls 12 12 in an endless series movable idly or traveling in response to the movement of the material being rolled has advantages over the mounting of said rolls in individual yielding bearings stationary above the carrier in that their rolling motion offers less frictional retardation to the passage of the material than would the rotation of stationary rolls in their bearings, and the series does not respond individually, but yields to or acts as a whole on inequalities in the material.

I claim—

1. A machine for rolling leather or similar material, comprising an endless flat traveling apron or carrier having its operative portion rigidly supported, and a series of traveling opposed rollers adapted to press the work against said carrier.

2. A machine for rolling leather or similar material, comprising an endless flat traveling apron or carrier having its operative portion rigidly supported, and a series of traveling opposed yieldingly-mounted rollers adapted to press the work against said carrier.

3. A machine for rolling leather or similar material, comprising an endless flat traveling apron or carrier having its operative portion rigidly supported, and a traveling opposed endless series of rollers idly mounted and adapted to press the work against said carrier.

4. A machine for rolling leather or similar material, comprising an endless flat traveling apron or carrier having its operative portion rigidly supported, a traveling opposed endless series of rollers idly mounted and adapted to press the work against said carrier, and a bearing-surface for said rollers forming a backing or support for the operative stretch of the series.

5. A machine for rolling leather or similar material, comprising an endless flat traveling apron or carrier having its operative portion rigidly supported, an opposed endless series of rollers idly mounted and adapted to press the work against said carrier, a pair of guide-rolls supporting and guiding said series of rollers, a frame journaling said guide-rolls and having a cross-piece which presents a bearing-surface or backing for the operative stretch of said series, and means yieldingly pressing the said frame in the direction of the carrier.

In testimony whereof I have affixed my signature in presence of two witnesses.

HAROLD A. WEBSTER.

Witnesses:
  C. F. BROWN,
  A. D. HARRISON.